United States Patent [19]

Tsuboi

[11] Patent Number: 5,136,496
[45] Date of Patent: Aug. 4, 1992

[54] MASTER/SLAVE NUMERICAL CONTROL APPARATUS IN WHICH THE MASTER CAN IDENTIFY TYPES AND ORDER OF THE SLAVES

[75] Inventor: Shunji Tsuboi, Aichi, Japan
[73] Assignee: Mitsubishi Denki K.K., Tokyo, Japan
[21] Appl. No.: 555,878
[22] Filed: Jul. 23, 1990

[30] Foreign Application Priority Data

Dec. 7, 1989 [JP] Japan ............... 1-316385

[51] Int. Cl.$^5$ ............... G05B 19/18; G06F 13/12
[52] U.S. Cl. ............... 364/132; 364/230.4; 364/228.4; 364/240.9; 364/284.3; 364/DIG. 1
[58] Field of Search ............... 364/132, 140, 141, 230.4, 364/242.94, 284.3, 228.4, 240.9

[56] References Cited

U.S. PATENT DOCUMENTS

| | | | |
|---|---|---|---|
| 4,245,306 | 1/1981 | Besemer et al. | 364/200 |
| 4,281,315 | 7/1981 | Bauer et al. | 364/200 |
| 4,458,309 | 7/1984 | Wilder, Jr. | 364/200 |
| 4,787,025 | 11/1988 | Cheselka et al. | 364/200 |
| 4,937,825 | 6/1990 | Ballard et al. | 364/200 |

*Primary Examiner*—Jerry Smith
*Assistant Examiner*—Patrick D. Muir
*Attorney, Agent, or Firm*—Sughrue, Mion, Zinn Macpeak & Seas

[57] ABSTRACT

In a numerical control apparatus comprising a control unit having a master card and a plurality of slave cards, the master card of the control unit transmits a read address signal code, a card name large classification code, and plural card identification address information to slave cards as a check address signal and the slave cards send back card name small classification code and plural card number code to the master card in response to the check address signal, so that the master card can identify the types of the slave cards and the order of the same type cards in the slave cards.

1 Claim, 7 Drawing Sheets

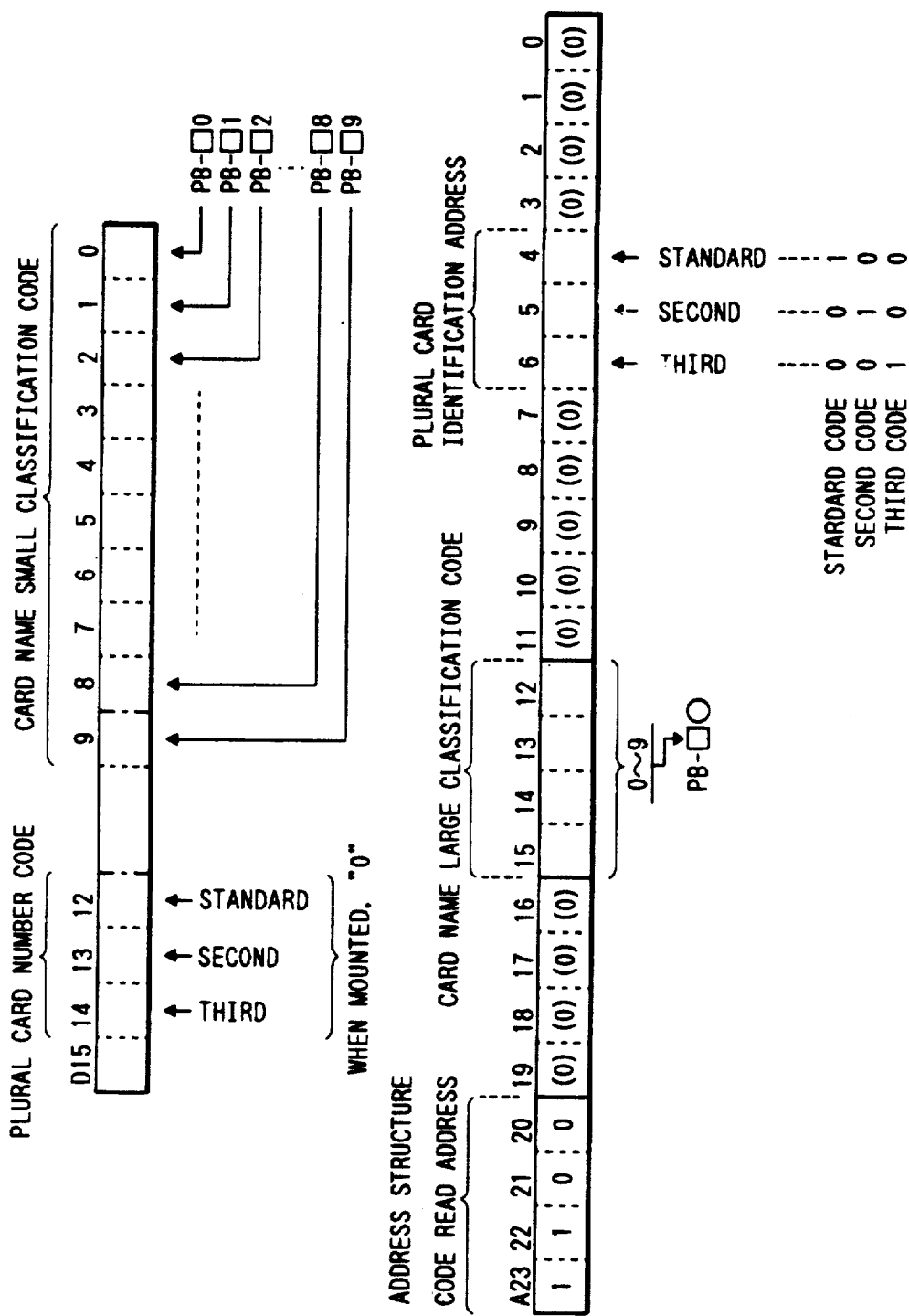
FIG. 1(a) DATA STRUCTURE
FIG. 1(b) ADDRESS STRUCTURE

FIG. 8

PIN ARRANGEMENT OF VMEbus

J1 PIN ARRANGEMENT

| PIN NUMBER | A ROW SIGNAL MNEMONIC | B ROW SIGNAL MNEMONIC | C ROW SIGNAL MNEMONIC |
|---|---|---|---|
| 1 | D00 | BBSY* | D08 |
| 2 | D01 | BCLR* | D09 |
| 3 | D02 | ACFAIL* | D10 |
| 4 | D03 | BG0IN* | D11 |
| 5 | D04 | BG0OUT* | D12 |
| 6 | D05 | BG1IN* | D13 |
| 7 | D06 | BG1OUT* | D14 |
| 8 | D07 | BG2IN* | D15 |
| 9 | GND | BG2OUT* | GND |
| 10 | SYSCLK | G3IN* | SYSFAIL* |
| 11 | GND | BG3OUT* | BERR* |
| 12 | DS1* | BR0* | SYSRESET* |
| 13 | DS0* | BR1* | LWORD* |
| 14 | WRITE* | BR2* | AM5 |
| 15 | GND | BR3* | A23 |
| 16 | DTACK | AM0 | A22 |
| 17 | GND | AM1 | A21 |
| 18 | AS* | AM2 | A20 |
| 19 | GND | AM3 | A19 |
| 20 | IACK* | GND | A18 |
| 21 | IACKIN* | SERCLK | A17 |
| 22 | IACKOUT* | SERDAT* | A16 |
| 23 | AM4 | GND | A15 |
| 24 | A07 | IRQ7* | A14 |
| 25 | A06 | IRQ6* | A13 |
| 26 | A05 | IRQ5* | A12 |
| 27 | A04 | IRQ4* | A11 |
| 28 | A03 | IRQ3* | A10 |
| 29 | A02 | IRQ2* | A09 |
| 30 | A01 | IRQ1* | A08 |
| 31 | -12V | +5VSTDBY | +12v |
| 32 | +5V | +5V | +5V |

MASTER/SLAVE NUMERICAL CONTROL APPARATUS IN WHICH THE MASTER CAN IDENTIFY TYPES AND ORDER OF THE SLAVES

BACKGROUND OF THE INVENTION

The present invention relates to a numerical control apparatus comprising a control unit having a master card and a plurality of slave cards, particularly relates to a numerical control apparatus comprising a control unit where the master card can check the structure of the slave cards.

FIG. 6 is a block diagram showing the structure of a conventional numerical control apparatus (hereinafter referred to as NC apparatus). In the figure, reference numeral 1 designates a display unit; 2, an operation board for entering key data; 3, an I/O unit such as a tape reader or tape puncher; 4, a drive unit for driving a working machine 5; 5, the working machine; and 10, a control unit for controlling the entire of the NC apparatus.

Conventionally, the NC apparatus is structured as described above. The control unit 10 performs computing and storing based on machining information which is stored in a paper tape mounted on the I/O unit 3 (such as a tape reader). The control unit 10 also performs processing of image data which is displayed on the display unit 1 as well as controlling the positions and speeds of the axes of the working machine 5 via the drive unit 4. The drive unit 4 drives the working machine 5 based on the control information which is output from the control unit 10.

FIG. 7 is an external view showing the structure of the control unit of FIG. 6. Reference numeral 11 designates a case of the control unit; 12, a bus connector which is connected to, for example, a VME bus line; 13, a master card on which a microprocessor (hereinafter referred to as CPU) 16 is mounted; 14-1 to 14-n, slave cards; and 15, a mother board. The master card 13 and the plurality of slave cards 14-1 to 14-n are connected via respective bus connectors 12 to the mother board 15. Signals or power and ground lines between the cards are connected via printed circuit cards.

FIG. 8 is a pin assignment table of pin numbers and signal names of the VME bus which is one example of buses connected to the bus connectors 12. In the VME bus, three rows A, B and C have 32 pins, respectively. In total, 96 pins of signal lines are connected to the bus connectors 12.

FIG. 9 is a waveform diagram of major signals which are used when data is transferred.

By referring to FIGS. 8 and 9, the operation of the control unit shown in FIG. 7 will be described in the following. The CPU 16 mounted on the master card 13 shown in FIG. 7 transmits and receives various data to and from the slave cards 14-1 to 14-n having data storage and I/O functions via the bus connectors 12 and the common signal bus of the mother board 15 in accordance with the specified control program. FIG. 9 shows waveforms of major signals which are used when data is transferred. For example, when the master card 13 reads data from the slave cards 14-1 to 14-n, it outputs an address signal (24 bits of $A_{23}$ to $A_0$) and then outputs an address strobe (hereinafter referred to as AS) signal of "0" level. The slave cards 14-1 to 14-n output a data signal (16 bits of $D_{15}$ to $D_0$) specified by the received address signal and complete the data transfer operation.

Since the control unit of the conventional NC apparatuses is structured as described above, the types and names of the slave cards being mounted are not considered. At most, the slave cards only transmit codes representing the card names or card types in response to the address signal sent from the master card. Thus, when the number of card types is increased or when there are a plurality of same type cards, there occurs a problem that it becomes impossible to manage the structure of the cards being mounted.

In addition, to read codes which represent the card types and card names, it is necessary to provide new signal lines, which results in changing the structure of the standard bus.

SUMMARY OF THE INVENTION

An object of the present invention is therefore to solve the above problems and to provide an NC apparatus with a control unit which can manage the structure of cards being mounted without changing the structure of the standard bus.

The numerical control apparatus according to the present invention comprises a control unit having a master card and a plurality of slave cards, each of which is mutually connected via a common bus line. The master card comprises check address signal generation and transmission means for generating code read address information, card name large classification code information, card name large classification code information and plural card identification address information as a check address signal and for transmitting the address signal to the plurality of slave cards via the bus line to check the structure of the plurality of slave cards, and answer data signal reception and identification means for receiving card name small classification code information and plural card number code information transmitted from the plurality of slave cards as a data signal via the bus line in response to the check address signal and for identifying the types or names of the plurality of slave cards and order of same type cards in the slave cards. Each of the plurality of slave cards comprises plural card number code information setting means for arbitrarily setting the plural card number code information which represents the order of the same type cards in the slave cards, check address signal reception means for receiving the check address signal which is sent from the master card, and answer data signal generation and transmission means for generating the card name small classification code information and the plural card number code information which has been set, in response to the output of the check address signal reception means, as a data signal and for transmitting the data signal to the master card via the bus line.

The numerical control apparatus according to the present invention comprises the control unit having the master card and the plurality of slave cards, each of which is mutually connected via a common bus line. In the master card, the check address signal generation and transmission means generates code read address information, card name large classification code information and plural card identification address information as the check address signal and transmits the address signal to the plurality of slave cards via the bus line to check the structure of the plurality of slave cards. The answer data signal reception and identification means receives card name small classification code information and plural card number code information transmitted from the plurality of slave cards as a data signal via the bus line in response to the check address signal and identifies the types or names of the plurality of slave cards and order of same type cards in the slave cards. In each of the plurality of slave cards, the plural card number code information setting means arbitrarily sets the plural card number code information which represents the order of the same type cards in the slave cards, the check address signal reception means receives the check address signal which is sent from the master card, and the answer data signal generation and transmission means generates the card name small classification code information and the plural card number code information which has been set, in response to the output of the check address signal reception means, as a data signal and transmits the data signal to the master card via the bus line.

BRIEF DESCRIPTION OF THE DRAWINGS

FIGS. 1 (a) and 1 (b) are diagrams describing the structure of the data and address embodying the present invention;

FIG. 8 is a pin number and signal table of a VME bus; and

DETAIL DESCRIPTION OF THE INVENTION

FIGS. 1 (a) and 1 (b) are descriptive views showing the structure of data and address embodying the present invention. FIGS. 6 to 9 described as a prior art are also used in common with the description of the present invention.

By referring to FIG. 1, card names for identifying cards will be described. In this embodiment, a card name is represented as PB-□○ where □ is a numeric character ranging from 0 to 9 as a card name large classification code and ○ is also a numeric character ranging from 0 to 9 as a card name small classification code. Thus, by the combination of two numeric characters, 100 types of card names from PB-00 to PB-99 can be identified.

In the address structure of FIG. 1 (b), the code read address is set to the high order 4 bits $A_{23}$ to $A_{20}$ of the address signal. Since the data value is represented in hexadecimal notation, for example, data "1100" is "12" in decimal notation and "C" in hexadecimal notation.

4 bits of $A_{15}$ to $A_{12}$ of the address data are set as a card name large classification code. With these bits, 10 types of codes ranging from 0 to 9 can be set. For example, the numeric character 9 is set as data "1001".

3 bits of $A_6$ to $A_{12}$ of the address data are set as a plural card identification address. When the code of the standard first card is read, "001" is set. When the code of the second card is read, "010" is set. When the code of the third card is read, "100" is set.

When the master card 13 transmits the address signal with the structure shown in FIG. 1 (b) for reading the card names to the slave cards 14-1 to 14-n, the slave cards 14-1 to 14-n send back 16 bit data $D_{15}$ to $D_0$ with the structure shown in FIG. 1 (a) to the master card for identifying the card names. 3 bits $D_{14}$ to $D_{12}$ of the data output by the slave cards 14-1 to 14-n output are set as a plural card number code. This code is enabled when the value is "0". For example, when the plural card number code is "110", it represents that one slave card with the same card name is mounted for the specified card name large classification code When the plural card number code is "100", it represents that two cards with the same cards name are mounted. When the plural card number code is "000", it represents that three cards with the same card name are mounted.

10 bits of $D_9$ to $D_0$ of the data are set as a card name small classification code. The bit showing "0" in the 10 bits represents the card name small classification code of the slave card. For example, when the bits $D_1$ and $D_3$ are "0", they represent that two cards PB-□1 and PB-□3 for the card name large classification code are mounted.

Figure 2A:
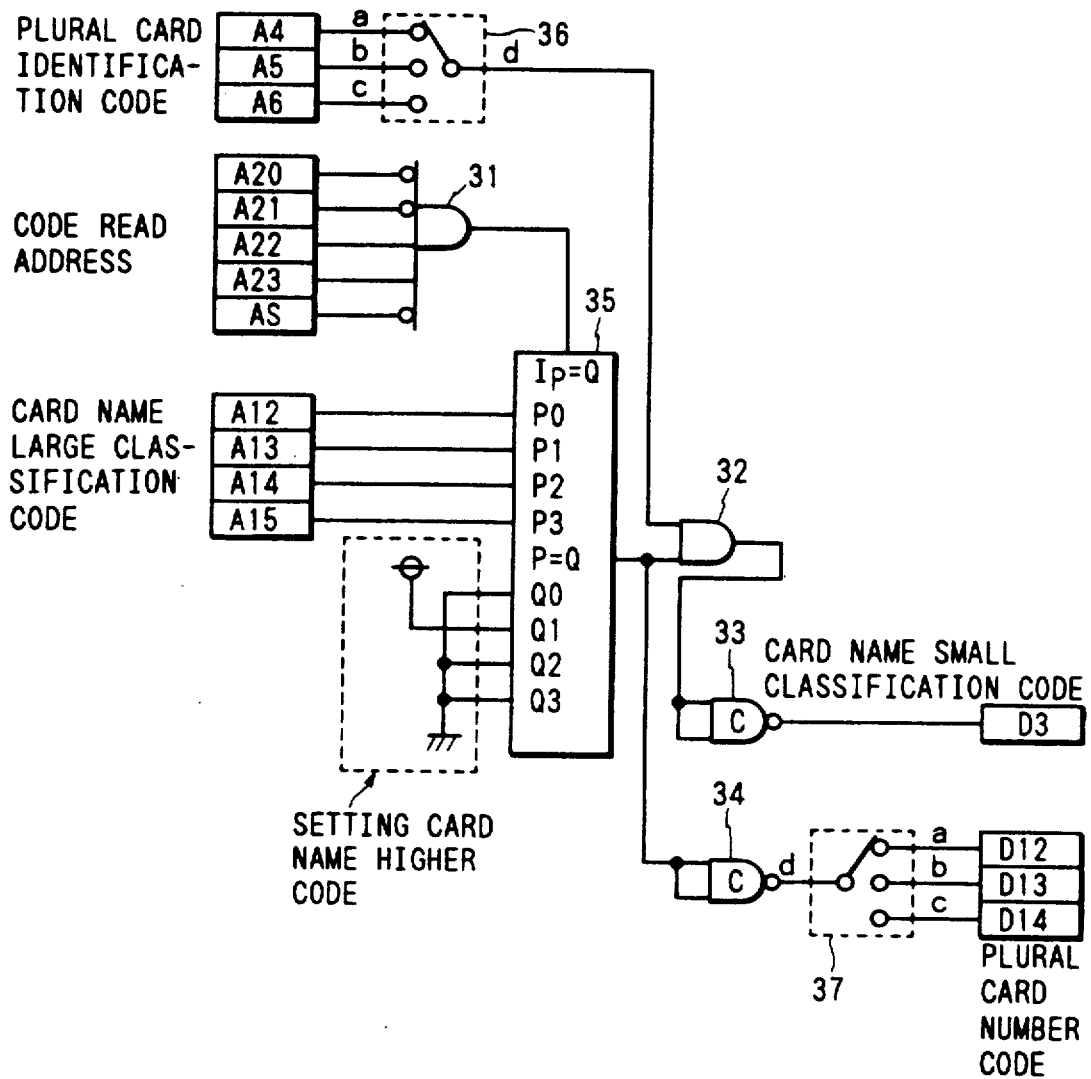
FIGS. 2 (a) and 2 (b) and FIG. 3 are circuit diagrams in the slave card embodying the present invention.
Figure 2B:
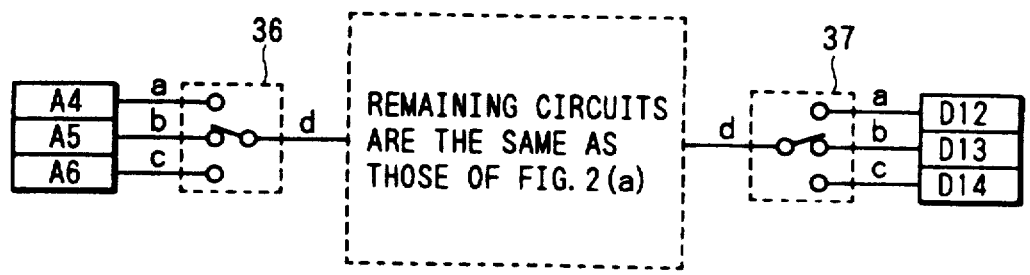

FIGS. 2 (a), 2 (b) and 3 are circuit diagrams in a slave card embodying the present invention. In those figures, reference numeral 31 denotes a selective gate. In this embodiment, when the address data bits $A_{23}$ to $A_{20}$ are "C" (that is, "1100") and when the AS signal becomes "0", the gate generates a selective output whose level is "1". Reference numeral 32 denotes an AND gate, 33 and 34 denote open collector NAND gates, and 35 denotes a comparator which sets the P=Q output to the "1" level when the cascade input $I_{P=Q}$ is in the "1" level and the 4 bit data $P_3$ to $P_0$ are equal to the data $Q_3$ to $Q_0$. 36 denotes a selective switch for setting the plural card identification code bits $A_6$ to $A_4$ of the address signal. 37 denotes a selective switch for setting the output bits of the plural card number code bits $D_{14}$ to $D_{12}$ of the data signal. The selective switches 36 and 37 are mounted on each slave card. When the card is mounted on the control unit 10, the switch selective positions are set according to the specification described later.

In the circuit of FIG. 2 (a), the data $Q_3$ to $Q_0$ which are input to one side of the comparator 35 as the card name high order code setting data are "0010", that is, the card name large classification code is "2". The output of the NAND gate 33 is connected to $D_3$, that is, the card name small classification code is "3". In the selective switch 36, the address signal bit $A_4$ is selected as the plural card number identification code and thereby the standard state is indicated. The selective switch 37 is connected to the data signal output bit $D_{12}$ of the plural card number code and thereby the standard state is indicated. In FIG. 2 (b), the selective switch 36 selects the plural card identification code bit $A_5$ and thereby the second card is indicated. The selective switch 37 selects the plural card number code bit $D_{13}$ and thereby the second card is indicated. Except for the setting positions of the selective switches 36 and 37, there is the same circuit as FIG. 2 (a).

Figure 3:
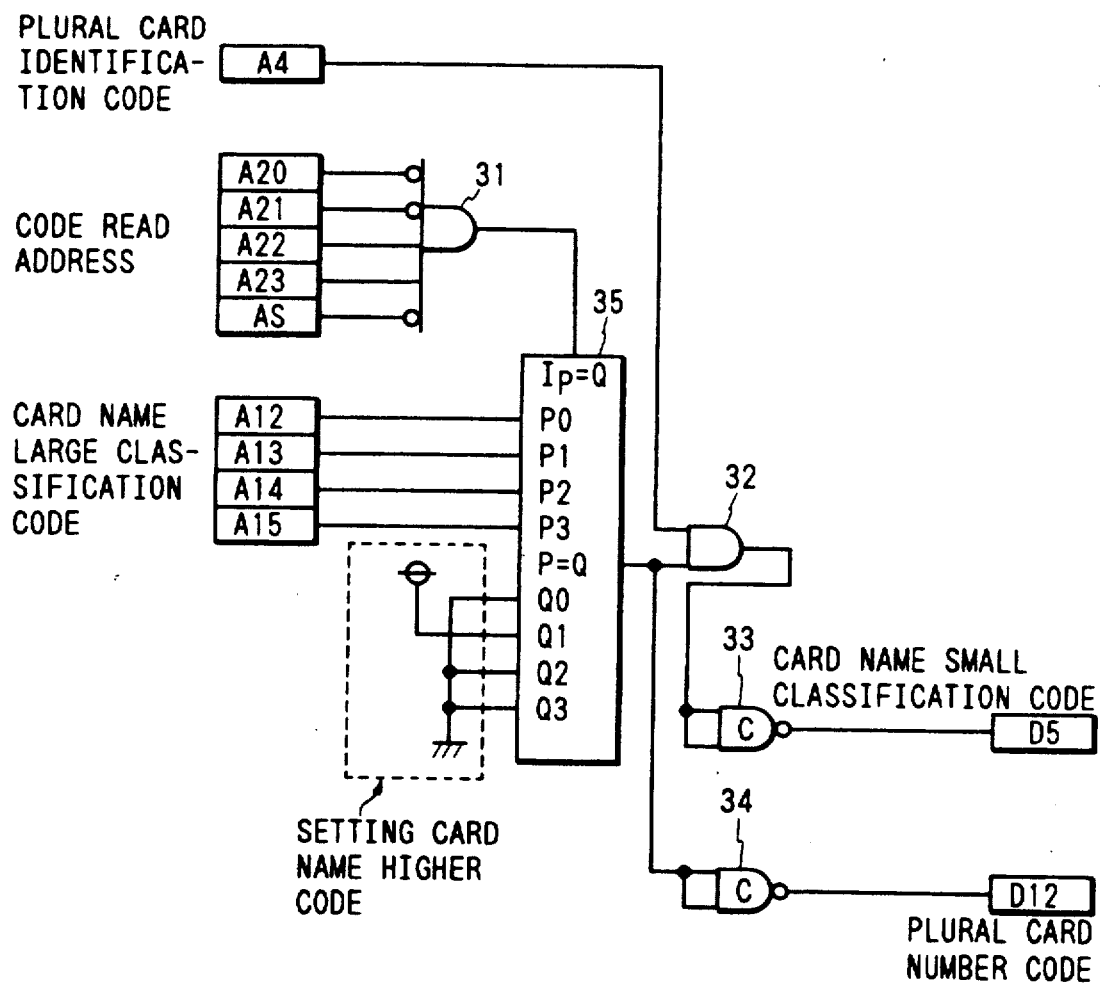

In FIG. 3, the data $Q_3$ to $Q_0$ which are input to the one side of the comparator 35 as the card name high order code setting data are "0001", that is, the card name large classification code is "1". The output of the NAND gate 33 is connected to $D_5$, that is, the card name small classification code is "5". In the circuit shown in FIG. 3, since plurality of same type cards are not mounted, the selective switches 36 and 37 are not provided, but direct connection in a standard case, that is, the same connection as FIG. 2 (a) is provided.

Thus, FIG. 2 (a) represents the standard card name PB-23, FIG. 2 (b) represents the second card name PB-23, and FIG. 3 represents the standard card name PB-15.

Figure 4:
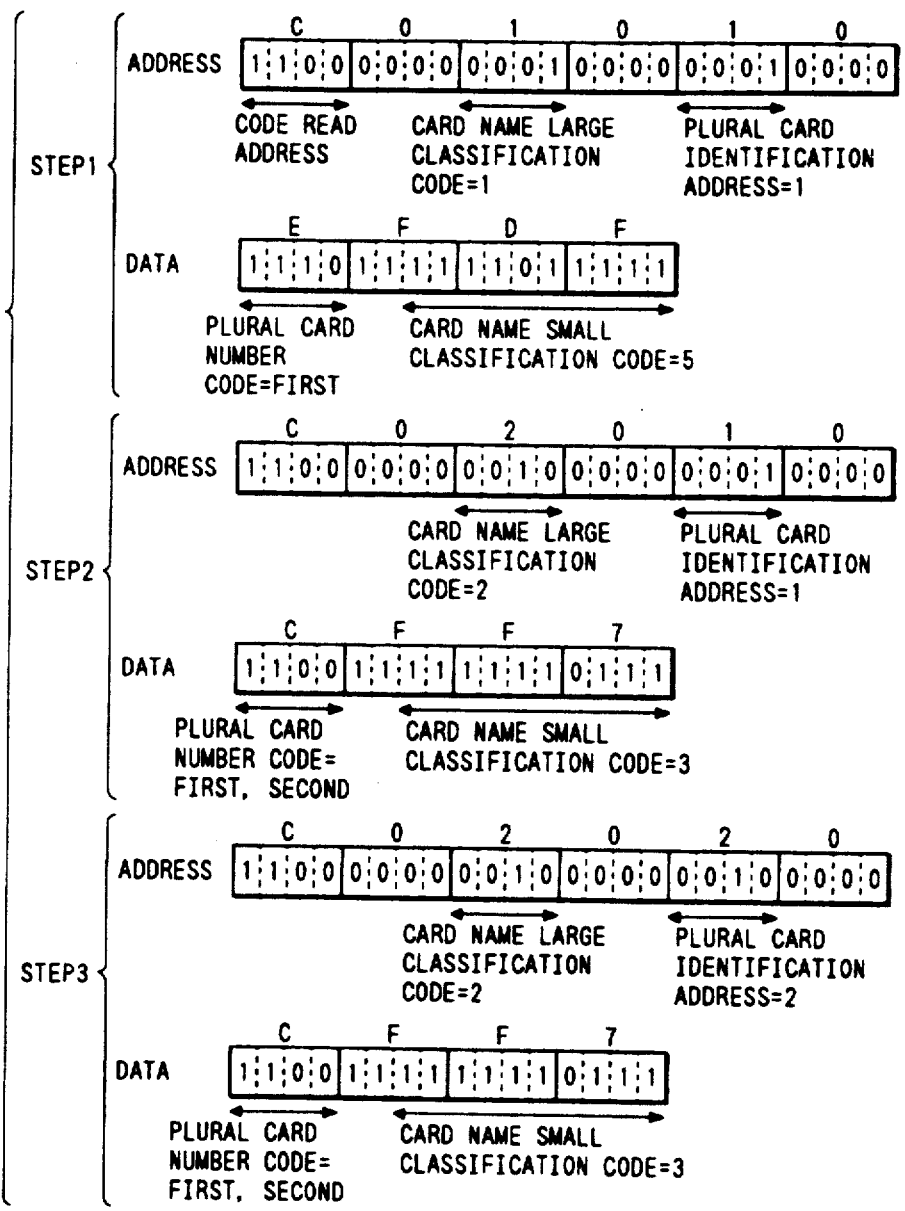
FIG. 4 is a diagram describing the card name read method embodying the present invention.

FIG. 4 is a diagram describing the card name read method embodying the present invention.

By referring to FIG. 4, the card name read method will be described. In step 1 of the figure, the CPU 16 in the master card 13 sets the address data bits $A_{23}$ to $A_0$ to "C01010" in hexadecimal notation and the AS (address strobe) signal to "0", to read the card name, as the standard specification in case that the card name large classification code is "1". In the slave card shown in FIG. 3, when the code read address bits $A_{23}$ to $A_{20}$ are "C" and the AS signal is "0", the output of the selective gate 31 becomes "1". When the card name large classification code bits $A_{15}$ to $A_{12}$ are "1" and they are supplied to the P input of the comparator 35, since the P input of the comparator 35 becomes equal to the Q input, $P=Q$ output becomes "1". Thus, in the plural card number code which is obtained as the reversed signal via the NAND gate 34, the bits $D_{12}$ which shows the standard state becomes "0". In addition, since the card name small classification code bit $A_4$ is "1", the data bit $D_5$ which is obtained via the AND gate 32 and the NAND gate 33 becomes "0". Thus, from the slave card shown in FIG. 3, the data $D_{15}$ to $D_0$ are output as "EFDF". The CPU 16 reads such data from the slave card and it is known that only one PB-15 card for the card name PB-1◯ is mounted.

In step 2 of FIG. 4, the CPU 16 sets the address data bits $A_{23}$ to $A_0$ to "C02010" and the AS signal to "0" as the standard specification in case that the card name large classification code is "2". In the slave card having the circuit shown in FIG. 2 (a), like step 1 above, the output of the selective gate 31 becomes "1"; the card name large classification code bits $A_{15}$ to $A_{12}$ are "2"; and the $P=Q$ output of the comparator 35 becomes "1". In addition, since the selective switches 36 and 37 are set in the standard state, the plural card number code bit $D_{12}$ is output as "0" and the card name small classification code bit $D_3$ which is output via the AND gate 32 and the NAND gate 33 is output as "0". When another slave card with the same name is mounted, by the setting of the selective switch 37 of FIG. 2 (b), the plural card number code bit $D_{13}$ also becomes "0". Thus, the data $D_{15}$ to $D_0$ sent from the slave card are "CFF7". The CPU 16 judges that the standard PB-23 card and the second PB-2◯ card for the card name PB-2◯ are mounted.

In step 3 of FIG. 4, the card name of the second PB-2◯ card is checked. The CPU 16 sets the plural card identification address bits $A_7$ to $A_4$ to "2", the address data bits $A_{23}$ to $A_0$ to "C02020", and the AS signal to "0" while the card name large classification code remains "2". The selective switch 36 of FIG. 2 (b) is set to the second card state, and $A_5$ is set to "1". The card name small classification code bit $D_3$ which is "0" is output via the AND gate 32 and the NAND gate 33. In the plural card number code bits $D_{14}$ to $D_{12}$, the standard $D_{12}$ which is "0" is output from the slave card shown in FIG. 2 (a); and according to the selective switch 37 shown in FIG. 2 (b), $D_{13}$ which is "0" is output as the second card. Thus, the data $D_{15}$ to $D_0$ are read as "CFF7" to the CPU 16. The CPU 16 judges that the second card name of PB-2◯ is PB-23.

Likewise, by varying the card name large classification code □ of the card name PB-□◯ from "0" to "9" and by checking the code, it is possible to check the names of all the slave cards mounted on the control unit 10.

Figure 5:
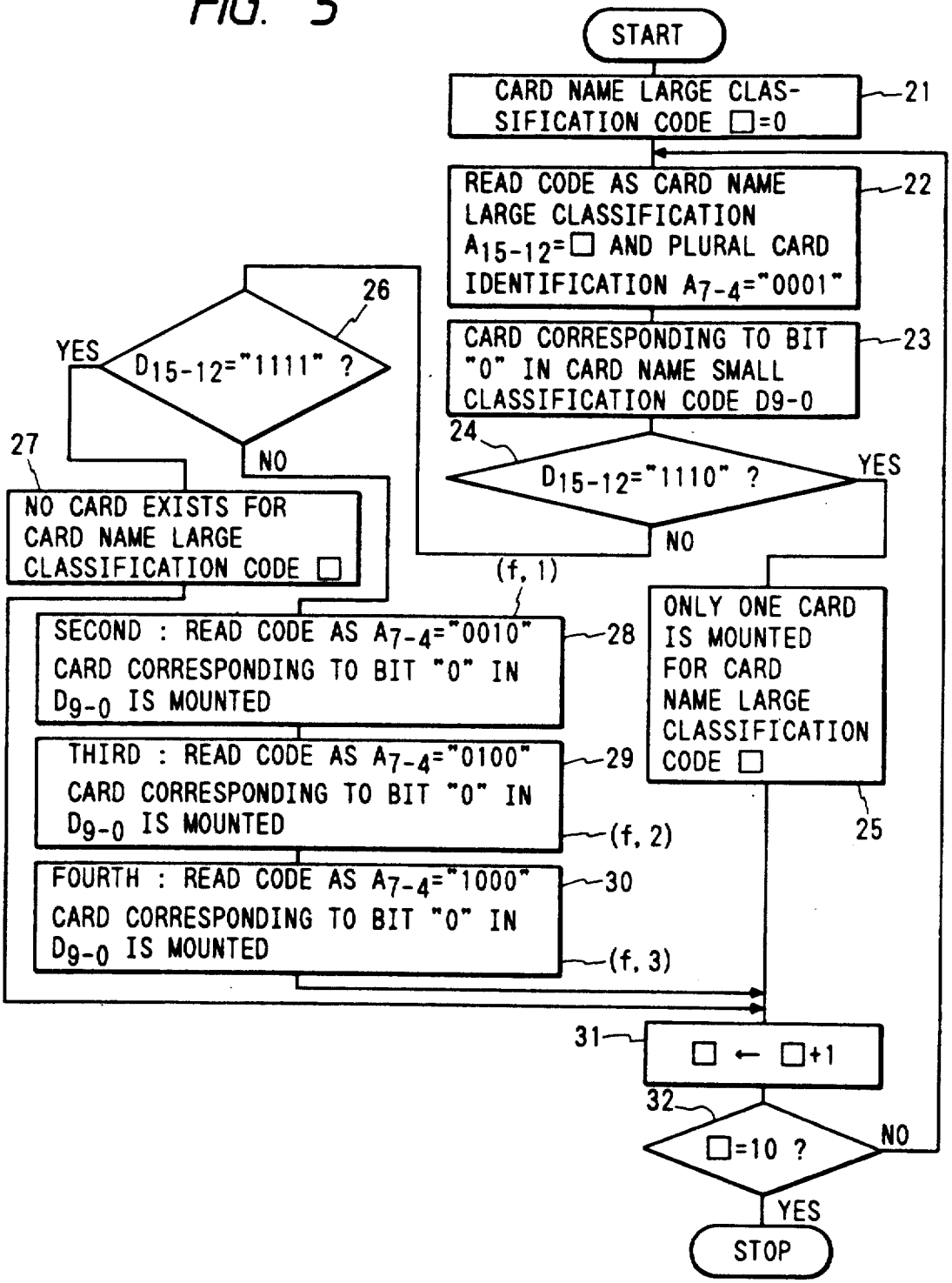
FIG. 5 is a flow chart describing the procedure for checking a slave card name embodying the present invention.
Figure 6:
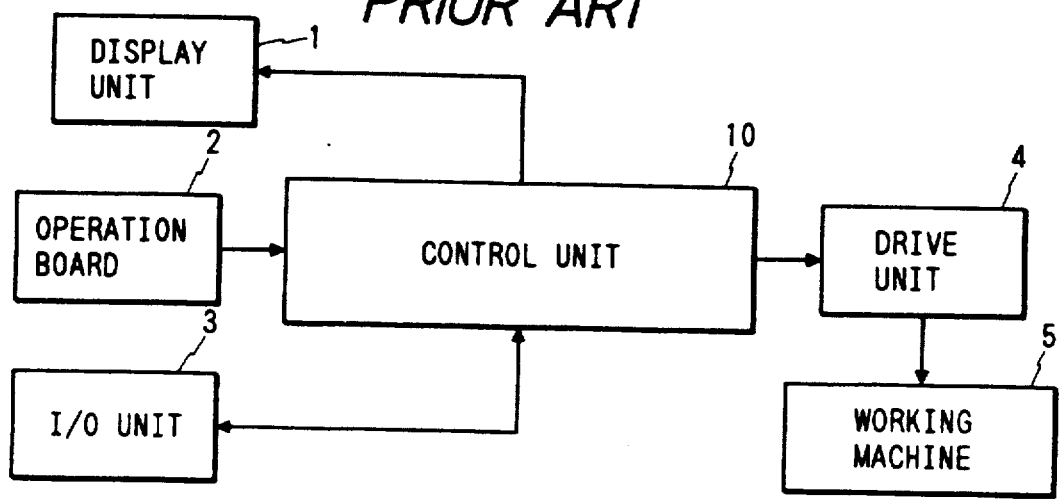
FIG. 6 is a block diagram of a conventional NC apparatus.
Figure 7:
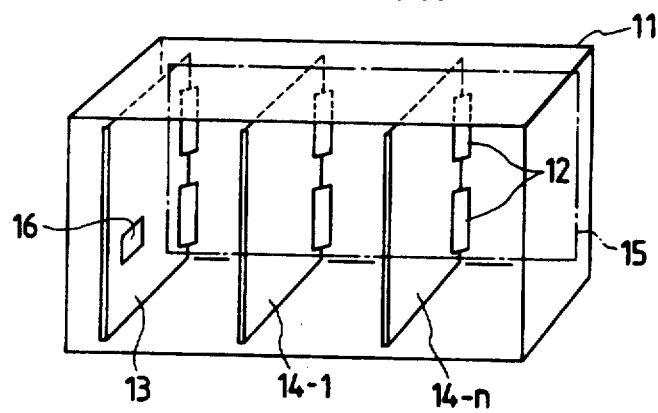
FIG. 7 is an external view showing the structure of the control unit of FIG. 6.
Figure 9:
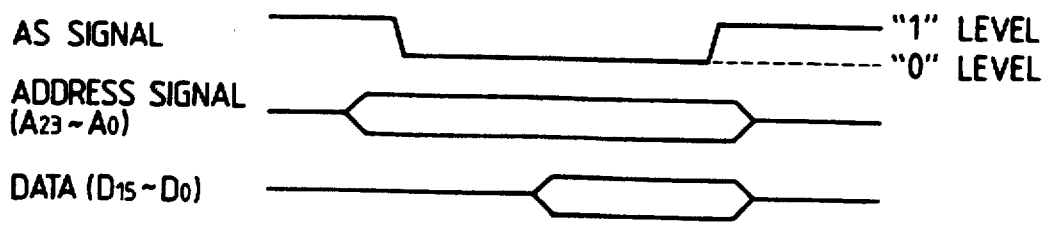
FIG. 9 is a view showing waveforms of major signals which are used when data is transferred.

FIG. 5 is a flow chart describing the procedure for checking the slave card names embodying the present invention. In the figure, an example for checking the names of all the slave cards is shown. In step 21 of the figure, as the initial setting, the value of □ which is specified by the card name large classification code of card name PB-□◯ is set to "0". In step 22, the card name large classification code bits $A_{15}$ to $A_{12}$ are set to the value of □ being set and the plural card identification address bits $A_7$ to $A_4$ are set to "0001", and then the data code is read from the slave card. In step 23, it is confirmed that the card corresponding to the bit "0" in the card name small classification code bits $D_9$ to $D_0$ is mounted. In step 24, it is determined whether or not the plural card number code bits $D_{15}$ to $D_{12}$ are "1110". When the determined result is YES, the process advances to step 25. When the determined result is NO, the process advances to step 26. In step 25, it is confirmed that only one slave card is present for the card name large classification code □ currently set. Then, the process advances to step 31. In step 26, it is determined whether or not the plural card number code bits $D_{15}$ to $D_{12}$ are "1111". When the determined result is YES, the process advances to step 27. When the determined result is NO, the process advances to step 28. In step 27, it is confirmed that no slave card for the card name large classification code □ currently set is present. Then, the process advances to step 31. In steps 28 to 30, when the plural card number code bits $D_{15}$ to $D_{12}$ are "1100", "1000", and "0000", a plurality of cards for the card name large classification code □ are present, and it is checked sequentially as shown in FIG. 5 that the second card (f, 1), the third card (f, 2), and the fourth card (f, 3) are mounted. In other words, in steps 28 to 30, the address bits $A_7$ to $A_4$ are set to "0010", "0100", and "1000" sequentially, and the data code is read from the slave card; it is confirmed that the card corresponding to the bit of "0" in the data bits $D_9$ to $D_0$ is mounted; and it is checked that the second card (f, 1), the third card (f, 2), and the fourth card (f, 3) are mounted. In step 31, "1" is added to the card name large classification code □ and the result becomes the new card name large classification code □. In step 32, it is judged whether or not the new card name large classification code □ becomes "10". When it becomes "10", the process is completed. When the card name large classification code □ is less than "10", the process returns back to step 22 and repeats the loop between step 22 and step 32.

In the above embodiment, the card name consists of two digits of PB-□◯. However, even if the number of bits for the card name large classification code are increased to use 3 digit card name such as PB-□◯△, the present invention is applicable. In this case, with codes ranging from PB-000 to PB-999, up to 1000 types of cards can be identified.

In addition, in the above embodiment, an example using mechanical selective switches 36 and 37 as setting means for plural card number identification code and plural card number code are used. However, it is obvious to be able to substitute non-contact logic elements having the same function for such mechanical switches.

In the above embodiment, the address and data are composed of 24 bits ($A_{23}$ to $A_0$) and 16 bits ($D_{15}$ to $D_0$), respectively. However, the number of their bits can be changed depending on the application to be used. Likewise, the number of bits of each code can be freely set depending on the application to be used.

Moreover, it is also possible to display the mounting information of the slave cards on a display unit so as to provide an operator with visual information.

As described above, according to the present invention, the master card of the control unit in the NC apparatus transmits code read address signal, card name large classification code information, and plural card identification address information to slave cards as a check address signal and the slave cards send back card name small classification code information and plural card number code information to the master card in response to the check address signal. Thus, the master card can identify the types of the slave cards and the order of the same type cards in the slave cards, and the production management and maintenance service management function of the NC apparatus is improved.

What is claimed is:

1. In a numerical control apparatus comprising a control unit having a master card and a plurality of slave cards, each of which is mutually connected via common bus line, wherein said master card comprises check address signal generation and transmission means for generating code read address information, card name large classification code information and plural card identification address information as a check address signal and for transmitting said check address signal to said plurality of slave cards, via said bus line in order to check the structure of said plurality of slave cards, and answer data signal reception and identification means for receiving card name small classification code information and plural card number code information transmitted from said plurality of slave cards as a data signal via said bus line in response to said check address signal and for identifying types or names of said plurality of slave cards and order of same type cards in said slave, and wherein each of said plurality of slave cards comprises plural card number code information setting means for arbitrarily setting said plural card number code information which represents said order of the same type cards in said slave cards, check address signal reception means for receiving said check address signal which is sent from said master card, and answer data signal generation and transmission means for generating said card name small classification code information and said plural card number code information which has been set, in response to an output of said check address signal reception means, as a data signal and for transmitting said data signal to said master card via said bus line.

* * * * *